June 11, 1968     S. F. MUTZ, JR     3,387,884
VEHICLE SEAT
Filed July 15, 1966     3 Sheets-Sheet 1
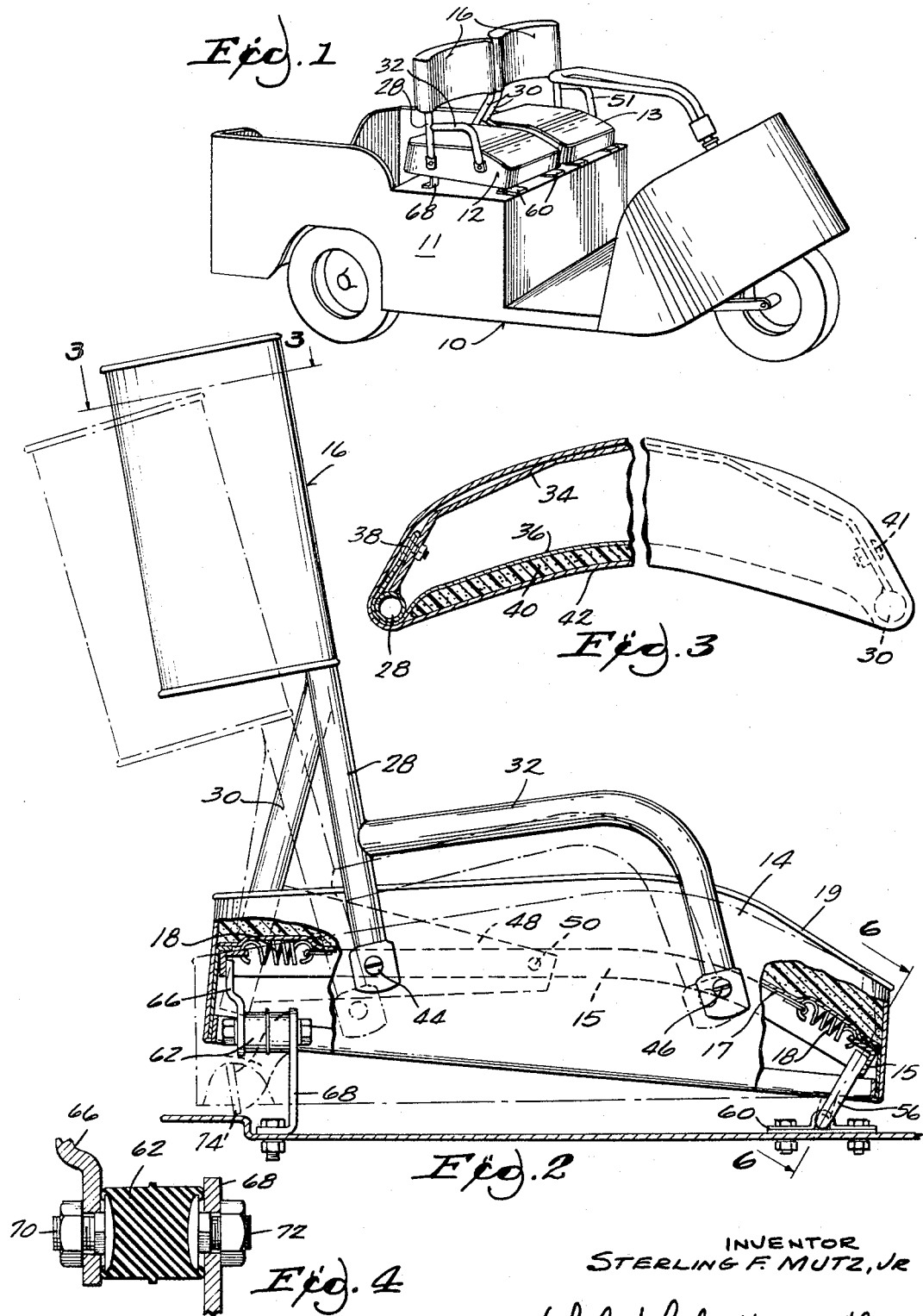
INVENTOR
STERLING F. MUTZ, JR
BY Wheeler, Wheeler, House & Clemency
ATTORNEYS

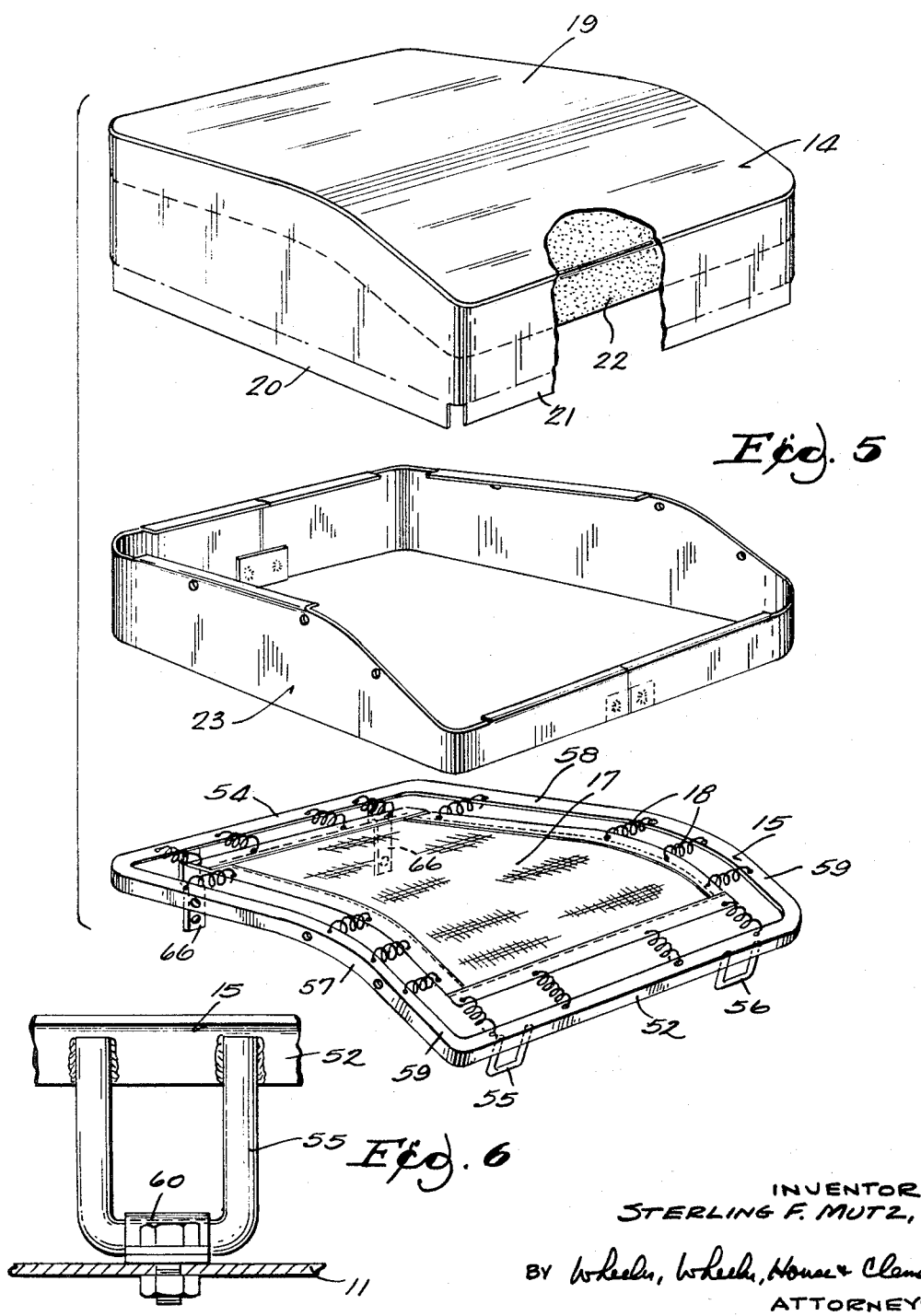

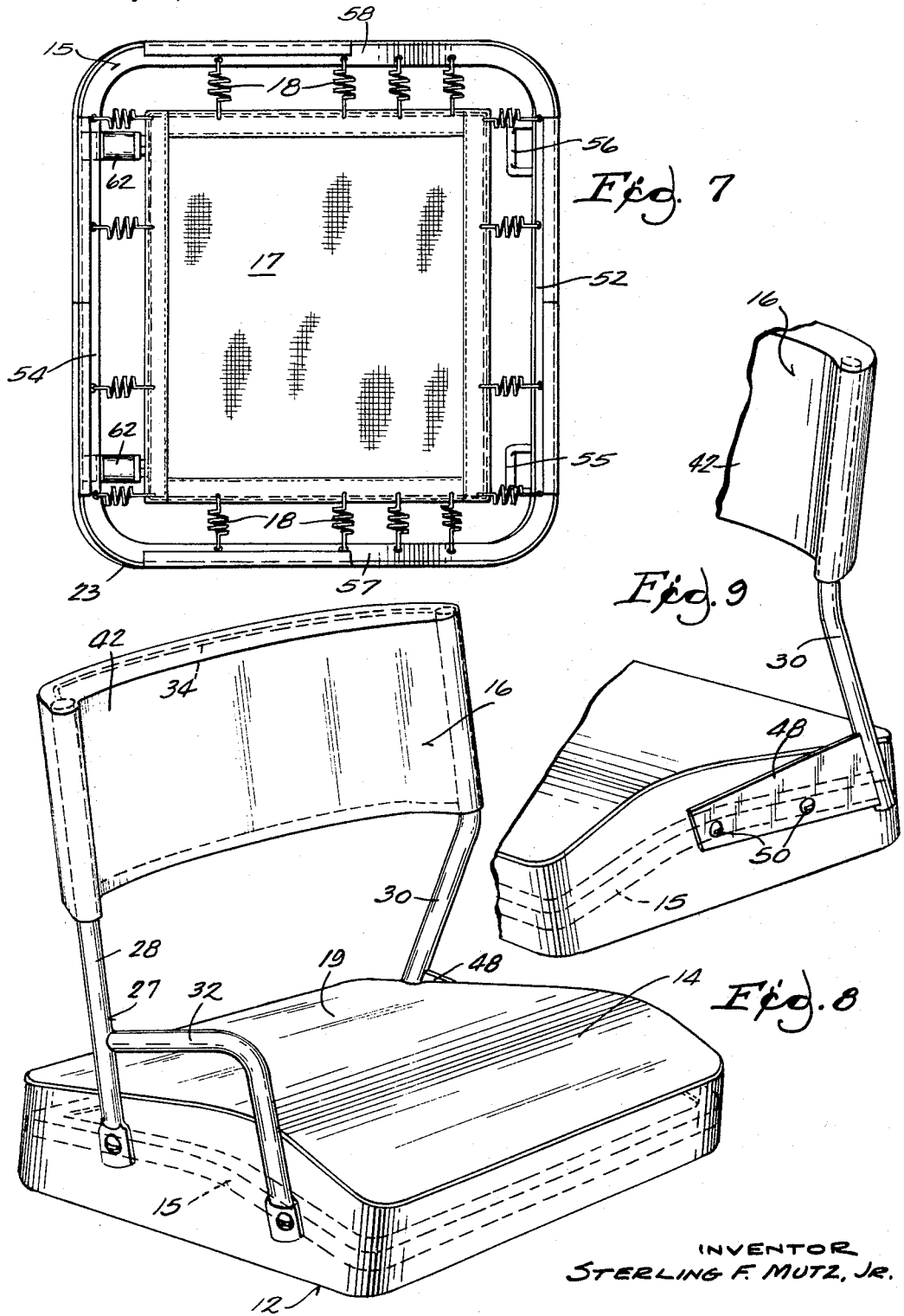

United States Patent Office 3,387,884
Patented June 11, 1968

3,387,884
VEHICLE SEAT
Sterling F. Mutz, Jr., Lincoln, Nebr., assignor to Outboard Marine Corporation, Waukegan, Ill., a corporation of Delaware
Filed July 15, 1966, Ser. No. 565,474
13 Claims. (Cl. 297—302)

ABSTRACT OF THE DISCLOSURE

Disclosed herein is the combination of a vehicle body, a seat comprising a frame having a forward member and a rearward member and a back rest rigidly supported by said frame and extending upwardly from adjacent the rear of said frame, means pivotally mounting said forward member of the frame on the vehicle body for rocking movement about a horizontal transverse axis, and means yieldably mounting the rear member of the frame to yieldably afford rocking movement of the frame about a transverse horizontal axis.

---

This invention relates generally to vehicles, and more particularly to seats therefor.

The present invention provides a vehicle seat with a dual suspension, with one suspension system employed to suspend or mount an entire seat frame and back rest to a vehicle body and also absorb heavy road shocks. The other suspension comprises a seat cushion and a cushion support which coacts with the cushion to absorb minor road shocks.

The suspension system provided for the entire seat frame and associated back rest involves the pivoting of a seat frame functioning as a lever about a fulcrum which comprises a pivotal connection between the seat frame and a vehicle body. The fulcrum provides a horizontal axis transverse to the direction of intended vehicle movement.

A rear member of the seat frame opposite the pivotal connection is suspended by an elastomeric beam which yieldably affords rocking movement of the seat about the fulcrum or horizontal axis. Heavy road shocks due to irregularities in the pavement or path of the vehicle will tend to pivot the seat about the horiozntal axis. The resistance of the beam to shear deformation yieldably opposses such rocking movement.

The suspension system provided for the seat cushion comprises a trampoline-like assembly generally including a taut fabric which is spring mounted within a rectangular frame. This support serves to absorb minor or light road shocks without transmitting them to the vehicle rider. The fabric cradles a rider to thereby assist in holding the rider in the seat against side sway and centrifugal forces affecting the rider during sharp vehicle turns.

Another feature of the present invention is to provide a seat with a back rest integral with the seat frame. The seat cushion and back rest move as a unit cradling the vehicle rider throughout the movement of the seat due to impact and thereby avoiding the jouncing experienced by a rider in a vehicle where the back rest and/or the seat is rigidly fixed to the vehicle.

Another object of the present invention is to provide a vehicle seat with an independent suspension which is adapted for use with similar seats on the same vehicle.

Further objects, features and advantages of the present invention will become apparent from the following description and accompanying drawings in which:

FIGURE 1 is a perspective view of a vehicle which includes a pair of seats and which embodies various of the features of the present invention;

FIGURE 2 is a partially sectioned, side elevational view of one of the seats shown in FIGURE 1;

FIGURE 3 is a plan view in partial section along line 3—3 of FIGURE 2;

FIGURE 4 is an enlarged sectional view of an elastomeric beam employed in the seat shown in FIGURE 2;

FIGURE 5 is an exploded view of the seat rest shown in FIGURE 2;

FIGURE 6 is an enlarged view along line 6—6 of FIGURE 2 showing the pivotable mounting of the seat frame;

FIGURE 7 is a top view of the seat rest frame incorporated in the seat shown in FIGURE 2;

FIGURE 8 is a side perspective view of the seat shown in FIGURE 2; and

FIGURE 9 is a fragmentary perspective view of the seat shown in FIGURE 2 which is taken from the side opposite that in FIGURE 8 and which illustrates the mounting of the back rest frame to the seat frame.

Referring now to the drawings, FIGURE 1 shows a vehicle generally designated 10 with a vehicle body 11 having two seats 12 and 13. Each seat is mounted independently of the other to the body 11 of the vehicle 10.

In the illustrated construction seats 12 and 13 are substantially identical, except as will hereinafter be explained. Accordingly only the seat 12 will be described in detail. The seat 12 includes a seat cushion 14 supported by a seat rest including a frame 15 and a back rest 16 which is rigidly secured to the seat frame 15.

The cushion suspension which serves to absorb minor road shocks is afforded by a trampoline-like assembly comprising a trampoline sheet 17 suspended within the seat frame 15. The sheet 17 can be a fabric such as canvas or any suitable synthetic material.

In the disclosed construction, as shown best in FIGURE 7, the sheet 17 is suspended within the frame 15 by a plurality of helical tension springs 18 arranged around the sheet and connected to the sheet and the frame 15. Various alternate methods of suspending the sheet 17 can be utilized, such as a web of rubber strips.

The cushion as shown in FIGURE 5 has a cover 19 having bottom flaps 20 and 21 which fold under the cushion pad 22 to protect the pad 22 from wear from the springs 18. The cushion is mounted on the seat frame 15 and secured thereto by a sheet metal apron 23.

The seat 12 includes, as shown in FIGURE 8, a back rest 16. In the disclosed construction, the back rest comprises a frame 27 with two upright members 28 and 30 and an arm rest 32. The members 28 and 30 are joined (see FIGURE 3) by a sheet metal support 34 which is welded to members 28 and 30. A cushion back rest pad 40 is carried by a fabric member 36 which, in turn, is mounted to the back rest frame 27 by being bolted at 38 and 41 to the sheet metal member 34. A pad 40 is covered and retained in place by a slip cover 42.

The back rest is rigidly secured to frame 15 by bolts 44 and 46 on one side and on the other or inner side by a gusset 48 bolted to the frame by bolts 50..

As the seat 12 is provided only with an outer arm rest 32, the seat 12 is adaptable for use with the seat 13 which also includes only an outer arm rest 51. Thus there is an open area unencumbered by arm rests between the seats 12 and 13.

The suspension system for absorbing large road shocks and for suspending or supporting the seat frame and back rest frame from the vehicle body comprises means pivotally mounting a forward frame member 52 to the vehicle body 11 and means yieldably mounting a rear frame member 54 to the vehicle body. This suspension affords rocking movement of the seat and back rest about a fulcrum which provides a horizontal axis transverse to the direction of intended vehicle movement.

In the disclosed construction, the means for pivotally mounting the frame 15 to the vehicle body 11, so as to provide a horizontal axis for rocking movement of the seat and back rest, includes two U-shaped bolts or members 55 and 56 welded or otherwise fixedly secured to forward frame member 52.

The frame 15 has two side members 57 and 58, each having a forwardly and downwardly curved portion 59. This portion 59 permits a right angle mounting of the U-bolts 55 and 56 to forward member 52 which in the disclosed construction is constructed of angle iron. Such mounting affords the desired rigidity to the U-bolts and also creates an angle between the U-bolt and the vehicle body 11. Such angular mounting permits rocking movement of the seat frame 15 about the fulcrum when a road shock causes a vertical force component.

Pivotal connection of the U-shaped members 55 and 56 to the vehicle body 11 is afforded by means in the form of clamps 60 which capture the bight of the U-bolts 55 and 56.

In the construction of the invention disclosed herein, the means yieldably mounting rear member 54 comprises an elastomeric beam 62 which is bonded to or sandwiched between a bracket 66 extending rigidly downwardly from the rear frame member 54 and a bracket 68 extending rigidly upwardly from the vehicle body 11. Two bolts 70 and 72 are mounted in the beam 62 and afford means for mounting the beam to the brackets 68 and 66.

When the seat is in use, a severe road shock will shift the seat frame and back rest about the fulcrum to the position shown by dash lines in FIGURE 2. The resulting shear stress on elastomeric beam 62 causes deformation of beam 62 as shown by the dash lines in FIGURE 2.

Extensive rearward rocking of the seat frame 15 relative to the vehicle body 11 is prevented by a stop 74 on the vehicle body.

Various of the features of the invention are set forth in the following claims.

What is claimed is:

1. A seat for a vehicle body, said seat comprising a seat frame having forward and rear members, a back rest including a frame rigidly secured to said seat frame and extending upwardly from adjacent the rear of said seat frame, means adapted for pivotally mounting one of said forward and rearward seat frame members on the vehicle body for rocking movement about a horizontal axis transverse to the intended direction of vehicle movement, and means adapted for yieldably mounting the other of said forward and rearward seat frame members to the vehicle body to yieldably afford rocking movement of said seat frame about said transverse horizontal axis.

2. A seat in accordance with claim 1 wherein said means adapted for yieldably mounting said other member of said seat frame comprises a flexible beam extending horizontally transverse to said horizontal transverse axis, means mounting one end of said beam to said other seat frame member, and means at the other end of said beam adapted for mounting of said beam to the vehicle body.

3. A seat in accordance with claim 2 wherein said flexible beam is constructed of elastomeric material.

4. A seat for a vehicle body, said seat comprising a seat frame having forward and rearward members, a seat rest, means supporting said seat rest on said seat frame, a back rest including a frame secured to said seat frame and extending upwardly from the rear of said seat rest, means adapted for pivotally mounting one of said forward and rearward seat frame members on the vehicle body for rocking movement about a horizontal axis transverse to the intended direction of vehicle movement and means adapted for yieldably mounting the other of said forward and rearward seat frame members to the vehicle body to yieldably obtain rocking movement of said seat frame about said transverse horizontal axis, said yieldably mounting means comprising a flexible beam extending transversely to said horizontal transverse axis, means for mounting one end of said beam to said other seat frame member comprising a bracket extending downwardly from said seat frame, and means at the other end of said beam adapted for mounting of said beam to the vehicle body comprising a bracket secured to the other end of said beam and extending downwardly.

5. A seat in accordance with claim 1 wherein said one frame member is said forward member and said means adapted for pivotally mounting said one member comprises at least one U-shaped member secured to said forward member and extending downwardly, and clamping means adapted for capturing the bight of said U-shaped member to the vehicle body while permitting pivotal movement thereof.

6. A seat in accordance with claim 1 wherein said seat frame comprises a rectangular frame including said forward and rear members and two parallel side members having forward portions curving downwardly.

7. A seat in accordance with claim 1 wherein said one seat frame member is said forward member and said means pivotally mounting said one member of said frame to the vehicle body comprises at least one downwardly and rearwardly extending U-shaped member perpendicular to said forward member of said seat frame.

8. A seat in accordance with claim 1 including a sheet of flexible material elastomerically mounted within said seat frame.

9. The combination of a vehicle body, a seat comprising a frame having a forward member and a rearward member, and a back rest rigidly supported by said frame and extending upwardly from adjacent the rear of said frame, means pivotally mounting said forward member of said frame on said vehicle body for rocking movement about a horizontal transverse axis, and means yieldably mounting said rear member of said frame to yieldably afford rocking movement of said frame about said transverse horizontal axis.

10. The combination of a vehicle body and first and second laterally adjacent seats, said first seat being provided with an arm rest adjacent to one side of said vehicle body, and said second seat being provided with an arm rest adjacent to the other side of said vehicle body, and each of said first and second seats further including a seat frame having forward and rear members, a back rest rigidly supported by said frame and extending upwardly from adjacent the rear of said seat rest frame, means pivotally mounting said forward member of said frame on said vehicle body for rocking movement about a horizontal axis transverse to the intended direction of vehicle movement, and means yieldably mounting said rear member of said frame to yieldably afford rocking movement of said frame about said transverse horizontal axis.

11. A seat for a vehicle body, said seat comprising a rectangular seat frame including forward and rearward members and two parallel side members having forward portions curving downwardly, a seat rest including a cushion, means supporting said seat rest on said seat frame including a sheet of flexible material elastomerically mounted on said seat frame, a back rest including a frame secured to said seat frame and extending upwardly from the rear of said seat rest, at least one U-shaped member fixedly secured to said forward member and extending downwardly, a clamp adapted for capturing the bight of said U-shaped member to the vehicle body while permitting pivotal movement of said seat frame about a horizontal axis transverse to the intended direction of vehicle movement, an elastomeric beam extending transverse to said horizontal transverse axis, a bracket fixedly secured to said rearward frame member and extending downwardly and being secured to one end of said beam, and a bracket secured to the other end of said beam and extending downwardly and adapted to be mounted to the vehicle body.

12. A seat for a vehicle body, said seat comprising a seat frame having forward and rearward members, means adapted for pivotally mounting one of said forward and rearward seat frame members on the vehicle body for rocking movement about a horizontal axis transverse to the intended direction of vehicle movement, a flexible beam of elastomeric material extending horizontally transversely to said horizontal transverse axis, means mounting one end of said beam to said other seat frame member, and means at the other end of said beam adapted for mounting of said beam to the vehicle body.

13. A seat for a vehicle body, said seat comprising a rectangular seat frame including forward and rearward members and two parallel side members having forward portions curving downwardly, a seat rest including a cushion, means supporting said seat rest on said seat frame including a sheet of flexible material yieldably mounted on said seat frame, a back rest including a frame secured to said seat frame and extending upwardly from the rear of said seat rest, at least one U-shaped member fixedly secured to said forward member and extending downwardly, an elastomeric beam extending transverse to said rearward member, a bracket fixedly secured to said rearward frame member, extending downwardly, and being secured to one end of said beam, and a mounting bracket secured to the other end of said beam.

References Cited

UNITED STATES PATENTS

| 2,100,475 | 11/1937 | Flint | 297—302 |
| 2,119,758 | 6/1938 | Suekoff | 297—302 |
| 2,373,751 | 4/1945 | Flint | 297—302 |
| 2,602,487 | 7/1952 | Flint | 297—302 |
| 3,059,967 | 10/1962 | Flint | 297—309 |

CASMIR A. NUNBERG, *Primary Examiner.*

BOBBY R. GAY, *Examiner.*

G. O. FINCH, *Assistant Examiner.*